United States Patent
Szczerba et al.

(10) Patent No.: US 11,938,821 B2
(45) Date of Patent: Mar. 26, 2024

(54) USER INTERACTION WITH 360 DEGREE 3D HOLOGRAPHIC DISPLAY

(71) Applicant: GM Global Technology Operations LLC, Detroit, MI (US)

(72) Inventors: Joseph F. Szczerba, Grand Blanc, MI (US); Kai-Han Chang, Sterling Heights, MI (US); Manoj Sharma, Troy, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/864,612

(22) Filed: Jul. 14, 2022

(65) Prior Publication Data

US 2024/0017612 A1   Jan. 18, 2024

(51) Int. Cl.
*B60K 35/00* (2006.01)
*G03H 1/00* (2006.01)
*G06F 3/01* (2006.01)
*G06F 3/16* (2006.01)
*H04N 13/368* (2018.01)
*H04N 13/383* (2018.01)

(52) U.S. Cl.
CPC .......... *B60K 35/00* (2013.01); *G03H 1/0005* (2013.01); *G06F 3/013* (2013.01); *G06F 3/016* (2013.01); *G06F 3/017* (2013.01); *G06F 3/167* (2013.01); *H04N 13/368* (2018.05); *H04N 13/383* (2018.05); *B60K 35/10* (2024.01); *B60K 35/211* (2024.01); *B60K 35/23* (2024.01); *B60K 35/25* (2024.01); *B60K 35/60* (2024.01); *B60K 2360/146* (2024.01); *B60K 2360/148* (2024.01); *B60K 2360/77* (2024.01); *G03H 2001/0061* (2013.01)

(58) Field of Classification Search
None
See application file for complete search history.

(56) References Cited

U.S. PATENT DOCUMENTS

| | | | |
|---|---|---|---|
| 2,770,166 A | 11/1956 | Gabor et al. | |
| 2015/0103004 A1* | 4/2015 | Cohen | G06F 3/04847 345/158 |
| 2019/0018364 A1* | 1/2019 | Kim | H04M 3/567 |
| 2020/0257364 A1* | 8/2020 | Strandberg | G06F 3/0482 |

(Continued)

OTHER PUBLICATIONS

Halle, MAS.450: Holographic Imaging, Massachusetts Institute of Technology, 2003, Massachusetts Institute of Technology, Cambridge, MA, USA.

(Continued)

*Primary Examiner* — Matthew Yeung
(74) *Attorney, Agent, or Firm* — Vivacqua Crane PLLC

(57) ABSTRACT

A method and a system for user interaction with a hologram includes displaying the hologram inside a passenger compartment of the vehicle, after displaying the hologram inside the passenger compartment of the vehicle, monitoring a vehicle user inside the passenger compartment of the vehicle to determine whether the vehicle user provided a user command, determining that the vehicle user provided the user command, and in response to determining that the vehicle user provided the user command, manipulating the hologram in accordance with the user command.

19 Claims, 4 Drawing Sheets

(56) References Cited

U.S. PATENT DOCUMENTS

2020/0406752 A1\* 12/2020 Ahn .................... G06F 3/04883
2022/0253182 A1\* 8/2022 Schwarz ................. G06F 3/038

OTHER PUBLICATIONS

Wilson, How Holograms Work, HowStuffWorks, Jan. 31, 1970, HowStuffWorks.com. <https://science.howstuffworks.com/hologram.htm> Oct. 6, 2023.
Wikihow Staff, How to Make a Hologram, wikiHow, Updated Jan. 8, 2023, wikiHow, USA.

\* cited by examiner

USER INTERACTION WITH 360 DEGREE 3D HOLOGRAPHIC DISPLAY

INTRODUCTION

The present disclosure relates to a system and method for user interaction with a hologram.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

In vehicles with camp-fire seating, it is desirable to display a hologram that is visible to all the passengers. In this case, however, a system should be able to manipulate this common hologram.

SUMMARY

The present disclosure describes a method and a system for user interaction with a single hologram shared by several vehicle users. In an aspect of the present disclosure, the method includes: displaying the hologram inside a passenger compartment of the vehicle; after displaying the hologram inside the passenger compartment of the vehicle, monitoring a vehicle user inside the passenger compartment of the vehicle to determine whether the vehicle user provided a user command; determining that the vehicle user provided the user command; and in response to determining that the vehicle user provided the user command, manipulating the hologram in accordance with the user command.

In an aspect of the present disclosure, determining that the vehicle user provided the user command includes determining that the vehicle user made virtual contact with the hologram. The vehicle user makes virtual contact with the hologram when a hand of the vehicle user is at a location that intersects the hologram.

In an aspect of the present disclosure, determining that the vehicle user provided the user command includes receiving a voice command from the vehicle user and determining that an eye gaze of the vehicle user is directed at the hologram.

In an aspect of the present disclosure, method monitoring the vehicle user inside the passenger compartment of the vehicle to determine whether the vehicle user provided the user command includes capturing an image of a hand of the vehicle user. Determining that the vehicle user provided the user command includes detecting a hand gesture by the vehicle user inside the passenger compartment of the vehicle.

In an aspect of the present disclosure, the method further includes determining a trajectory vector, a speed, and an orientation of the hand gesture by the vehicle user inside the passenger compartment of the vehicle.

In an aspect of the present disclosure, the method further includes determining a movement of the hologram based on the user command by the vehicle user inside the passenger compartment.

In an aspect of the present disclosure, manipulating the hologram includes moving the hologram in accordance with the user command.

In an aspect of the present disclosure, the method further includes providing haptic feedback to the vehicle user inside the passenger compartment in response to manipulating the hologram in accordance with the user command.

In an aspect of the present disclosure, manipulating the hologram in accordance with the user command includes changing a size of the hologram.

In an aspect of the present disclosure, the vehicle user inside the passenger compartment of the vehicle is a first vehicle user of a plurality of vehicle users inside the passenger compartment of the vehicle. The method further comprises updating the hologram from all viewpoints of the plurality of vehicle users.

The present disclosure also describes a vehicle. The vehicle includes a body defining a passenger compartment, a plurality of sensors disposed inside the passenger compartment, a holographic display configured to generate a hologram inside the passenger compartment, and a controller in communication with the plurality of sensors and the holographic display. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
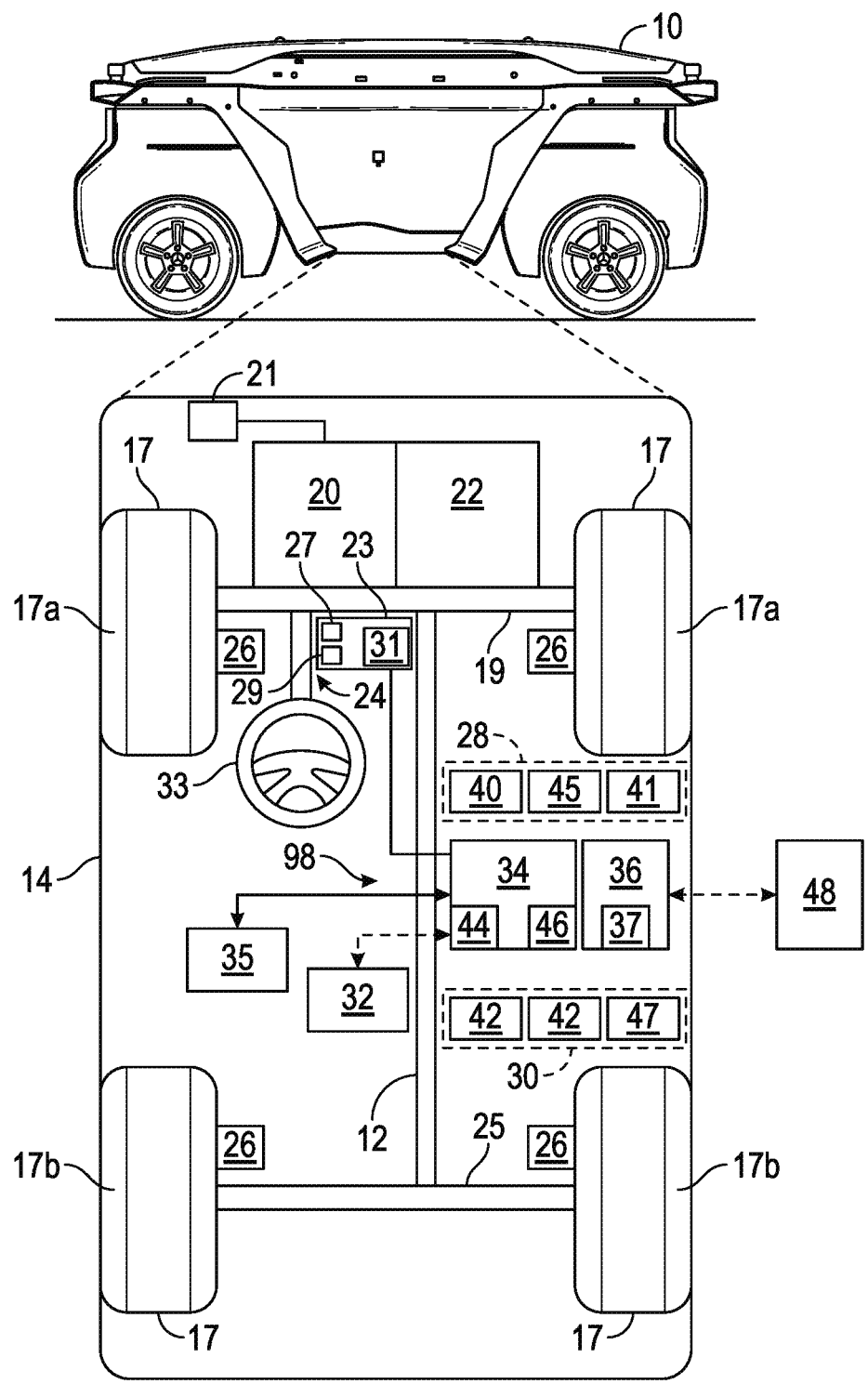
FIG. 1 is a block diagram depicting a vehicle including a system for low visibility driving.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a chassis 12, a body 14, front and rear wheels 17 and may be referred to as a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b.

In various embodiments, the vehicle 10 may be an autonomous vehicle, and a control system 98 is incorporated into the vehicle 10. The control system 98 may be referred to as the system or the system for user interaction with one or more holographic displays 29. The vehicle 10 is, for example, a vehicle that is automatically controlled to carry passengers from one location to another. The vehicle 10 may be configured as a truck, sedan, coupe, sport utility vehicle (SUV), recreational vehicles (RVs), etc. In an embodiment, the vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more radars, one or more light detection and ranging (lidar) sensors, one or more proximity sensors, one or more odometers, one or more ground penetrating radar (GPR) sensors, one or more steering angle sensors, Global Navigation Satellite System (GNSS) transceivers (e.g., one or more global positioning systems (GPS) transceivers), one or more tire pressure sensors, one or more cameras 41, one or more gyroscopes, one or more accelerometers, one or more inclinometers, one or more speed sensors, one or more three-dimensional (3D) depth sensor 45, one or more ultrasonic sensors, one or more inertial measurement units (IMUs), thermal imaging sensors, one or more microphones 31 and/or other sensors. Each sensor 40 is configured to generate a signal that is indicative of the sensed observable conditions (i.e., sensor data) of the exterior environment and/or the interior environment of the vehicle 10. Because the sensor system 28 provides sensor data to the controller 34, the sensor system 28 and its sensors 40 are considered sources of information (or simply sources).

The 3D depth sensors 45 are configured to acquire multi-point distance information across a Field-of-View (FoV) and measure the distance from the 3D depth sensors 45 to an object, such as a hand 15, within the FoV of the 3D depth sensor 45. Therefore, the 3D depth sensors 45 can output a matrix of multiple distance readings over the FoV to obtain an accurate picture with full 3D depth perception. As non-limited examples, the 3D depth sensors 45 may be Time-of-Flight sensors and stereo depth cameras. Stereo depth cameras may use Time-of-Flight principles and infrared light to determine the depth of a scene and construct a 3D model and spatially map the interior of the passenger compartment 54 in space as well as the position of the body 13 of the vehicle user 11 and the location of the hand 15 of the vehicle user 11. The body 14 of the vehicle 10 defines the passenger compartment 54.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

One or more of the actuator devices 42 are configured as a haptic actuator 47. The haptic actuator 47 is configured to provide haptic feedback to the vehicle user 11. In other words, the haptic actuator 47 is configured create an experience of touch by applying forces, vibrations, or motions to the vehicle user 11 inside the passenger compartment 54. As non-limiting examples, the haptic actuator 47 may be piezoelectric actuator, an eccentric rotating mass (ERM) actuator, a linear resonant actuator (LRA), ultrasound actuators, and/or a non-contact haptic actuator, such as air vortex ring actuators. The air vortex ring actuator may provide an air pulse to the vehicle user 11. The haptic actuator 47 is in communication with the controller 34, and the controller 34 is programmed to control the operation of the haptic actuator 47.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The vehicle 10 may further include one or more airbags 35 in communication with the controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may be programmed to execute a method 100 (FIG. 16) as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10. In various embodiments, one or more instructions of the controller 34 are embodied in the control system 98.

The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more holographic displays 29, one or more microphones 31 (e.g., a microphone array) and/or other devices suitable to provide a notification to the vehicle user of the vehicle 10. The user interface 23 is in electronic communication with the controller 34 and is configured to receive inputs by a user (e.g., a vehicle operator or a vehicle passenger). For example, the user interface 23 may include a touch screen and/or buttons configured to receive inputs from a vehicle user 11 (e.g., vehicle operator). Accordingly, the controller 34 is configured to receive inputs from the user via the user interface 23. While the microphone 31 is shown in FIG. 1 as part of the user interface 23, other microphones 31 may be part of the sensor system 28. The microphones 31 may be directly coupled to a headliner 52 of the vehicle 10 to capture voice commands from one or more passengers 11 in the passenger compartment 54 of the vehicle 10. It is envisioned, however, that the microphones 31 may be coupled to other parts of the vehicle 10. Regardless of its exact location, the microphones 31 is in communication with the controller 34. Accordingly, the microphone 31 may send sensor data (e.g., voice commands) to the controller 34.

The vehicle 10 may include one or more holographic displays 29 configured to display a 3D hologram 50 to one or more vehicle users 11. The holographic display 29 is configured to present one or more 3D holograms 50 to vehicle passengers 11 inside the passenger compartment 54. While the holographic display 29 is shown in FIG. 1 as part of the user interface 23, it is contemplated that the holographic display 29 may be directly coupled to the headliner 52 of the vehicle 10 in order to present one or more 3D holograms 50 to the vehicle passengers 11 inside the passenger compartment 54. However, it is contemplated that the holographic display 29 may be attached to another part of the vehicle 10. Regardless of its exact location, the holographic display 29 is in communication with the controller 34. Accordingly, the controller 34 is configured to control the operation of the holographic display 29.

The communication system 36 is in communication with the controller 34 and is configured to wirelessly communicate information to and from other remote vehicles 48, such as but not limited to, other vehicles ("V2V" communication), infrastructure ("V2I" communication), remote systems at a remote call center (e.g., ON-STAR by GENERAL MOTORS) and/or personal electronic devices, such as a mobile phone. In the present disclosure, the term "remote vehicle" means a vehicle, such as a car, configured to transmit one or more signals to the vehicle 10 while not physically connected to the vehicle 10. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the vehicle 10 and another vehicle. Further, the communication system 36 is configured to wirelessly communicate information between the vehicle 10 and infrastructure or other vehicles.

Figure 2:
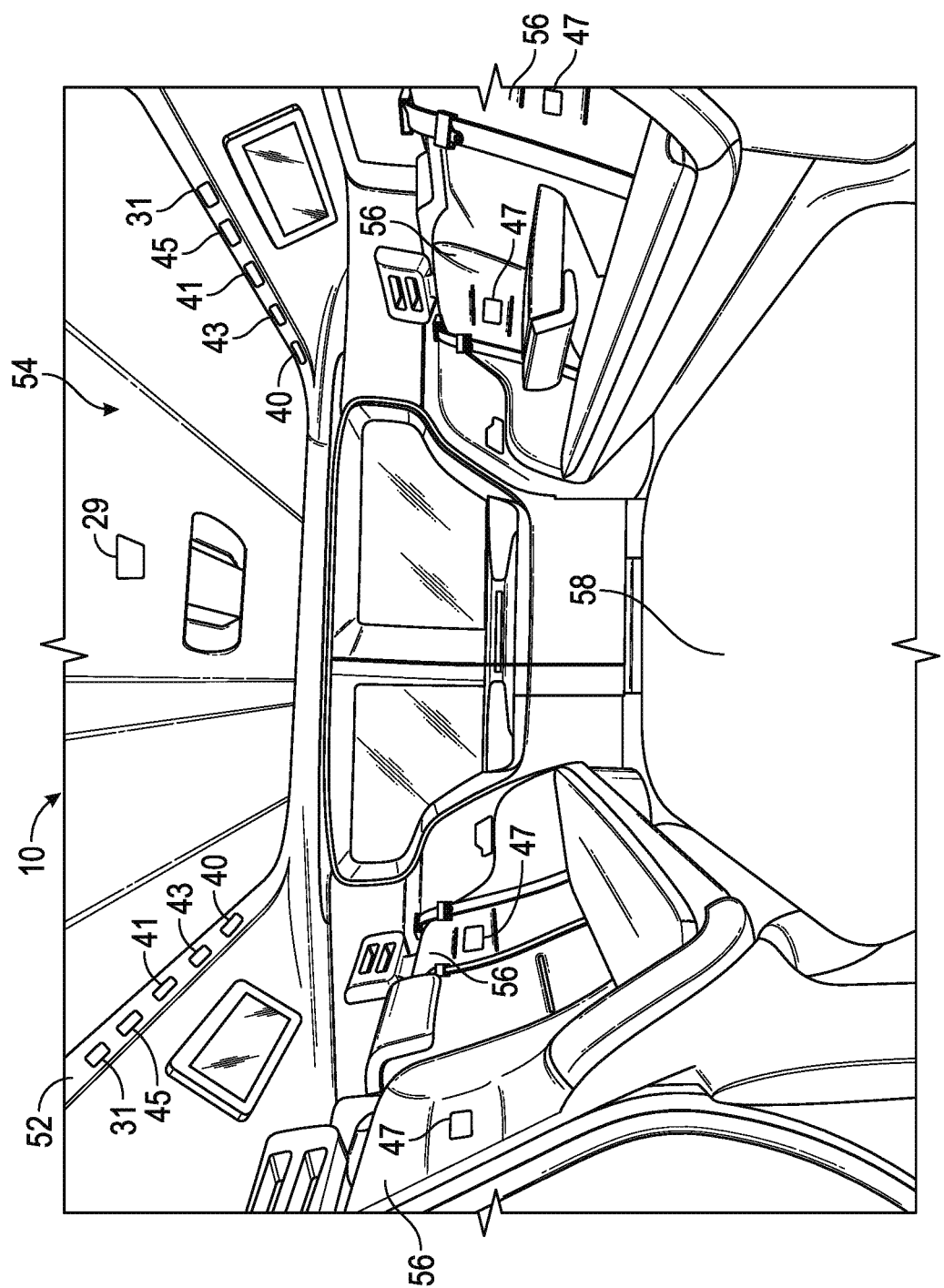
FIG. 2 is a schematic isometric side view of a passenger compartment of the vehicle of FIG. 1.
Figure 3:
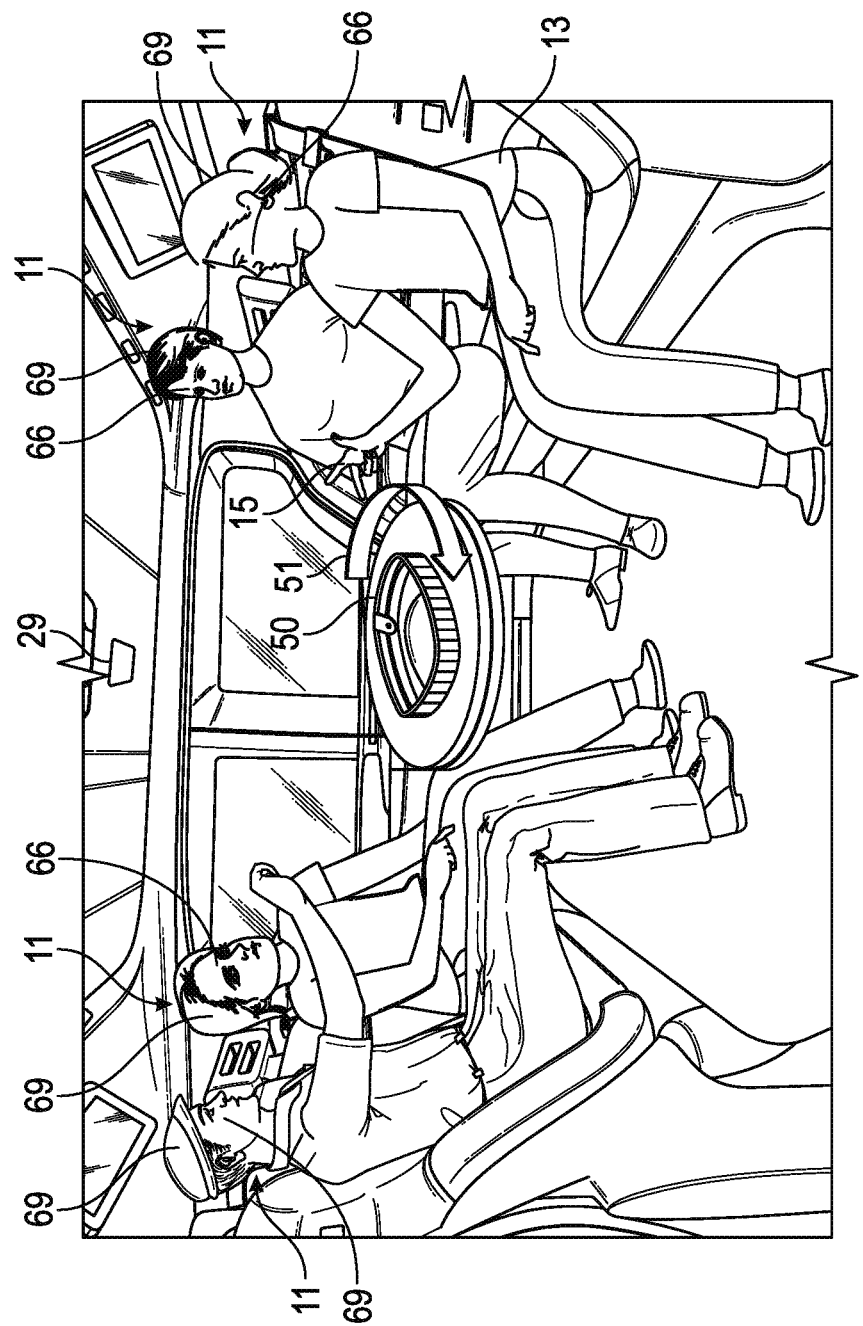
FIG. 3 is a schematic isometric side view of a passenger compartment of the vehicle of FIG. 1, depicting a three-dimensional (3D) hologram.
Figure 4:
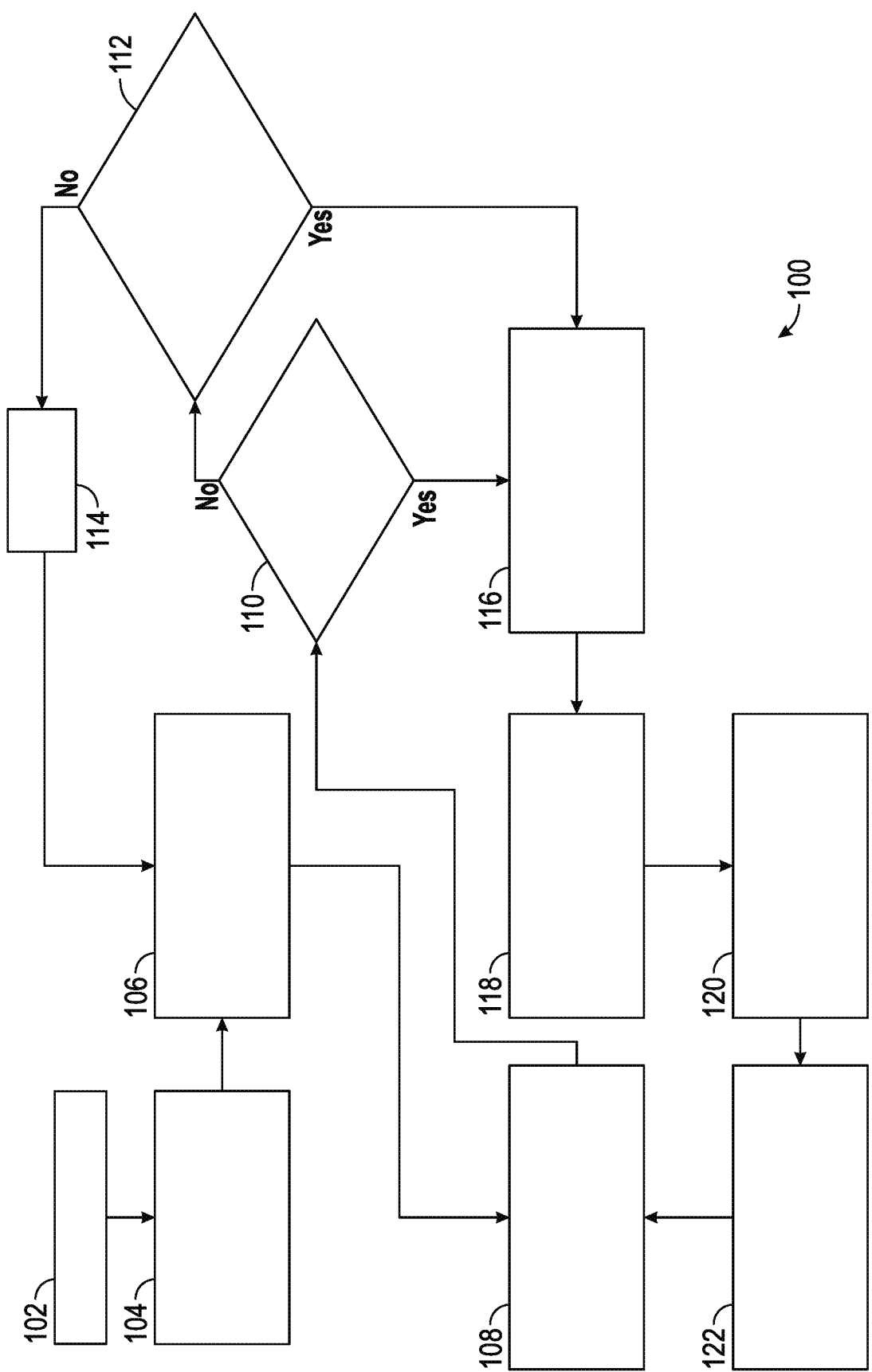
FIG. 4 is a flowchart for a method for user interaction with a 3D hologram.

With reference to FIGS. 2 and 3, the vehicle 10 includes a passenger compartment 54 shaped and sized to accommodate a plurality of passengers (i.e., vehicle users 11). In addition, the vehicle 10 includes a plurality of seats 56 inside the passenger compartment 54. The seats 56 are arranged in camp-fire seating configuration. In other words, some sets of seats 56 face another set of seats 56. The passenger compartment 54 is delimited by the headliner 52 and a vehicle floor 58 of the vehicle 10.

With continuing reference to FIGS. 2 and 3, the haptic actuators 47 may be directly coupled to some or all of the seats 56 to facilitate providing haptic feedback to the vehicle users 11 seated in the seats 56. It is contemplated, however, that the haptic actuators 47 may be coupled to other parts of the vehicle 10 inside the passenger compartment 54. At least some of the sensors 40 may be directly coupled to the headliner 52 of the vehicle to facilitate sensing movements by the vehicle users 11 and voice commands from the vehicle users 11 inside the passenger compartment 54. For instance, the microphones 31 may be directly coupled to the headliner 52 of the vehicle 10 to capture voice commands from one or more vehicle users 11 (e.g., passengers) in the passenger compartment 54 of the vehicle 10. The 3D depth sensors 45 may be directly coupled to the headliner 52 of the vehicle 10 to facilitate sensing the 3D location of each vehicle user 11 in the passenger compartment 54 of the vehicle 10. The cameras 31 may be directly coupled to the headliner 52 of the vehicle 10 to facilitate capturing images of the vehicle users 11 in the passenger compartment 54. At least one or more cameras 31 may be configured as user trackers 43 to track the movements of the head 69 and/or the eyes 66 of the vehicle user 11 inside the passenger compartment 54. The user trackers 43 may be directly coupled to the headliner 52 of the vehicle 10 to facilitate tracking the head 69 and/or the eyes 66 of the vehicle users 11 inside the passenger compartment 54.

With continued reference to FIGS. 2 and 3, the holographic display 29 may be directly coupled to the headliner 52 of the vehicle 10 in order to present one or more 3D holograms 50 to the vehicle passengers 11 inside the passenger compartment 54. However, it is contemplated that the holographic display 29 may be attached to another part of the vehicle 10. As depicted in FIG. 3, the vehicle users 11 may be seated around a common 360 perimeter display (i.e., the holographic display 29). Each vehicle user 11 has a different personal view of the common hologram 50 from their perspective. Any vehicle user 11 may user their hands 15, eyes 66, and/or voice to interact and manipulate the hologram 50. Multiple vehicle users 11 may cooperate in the manipulation of the common hologram 50 by simultaneously manipulating (e.g., by virtually touching, bending, stretching, folding, twisting, etc.) different parts of the hologram 50. When doing so, the other users' perspective (i.e., viewpoints) of the common hologram is changed accordingly. The haptic actuator 47 may provide haptic feedback to the vehicle user 11 that is manipulating the hologram 50.

With continued reference to FIGS. 2 and 3, the 3D hologram 50 spans 360 degrees around the holographic display 29 and may include, but is not limited to, an upcoming destination (e.g., stadium), a vehicle route and progress, information about vehicle technologies, internet searches on anything, information shared live from other at a different location not in the vehicle 10, etc. The 3D hologram 50 may be manipulated (e.g., rotated, move, resized, or activated) by any of the vehicle users 11 in the passenger compartments 54 by virtually touching the hologram 50, performing hand poses or gesture at a distance from the hologram 50, using speech and eye gaze toward the hologram 50, and/or using speech, eye gaze, and a gesture. As a non-limiting example, the vehicle user 11 may gaze at the hologram 50 and move the hand 15 in a rotating manner as indicated by arrow 51 to rotate the 3D hologram 50. The system 98 uses computer vision, 3D depth sensors 45, and artificial intelligence algorithms to monitor hand and arm gestures of the vehicle users 11. Then, the controller 34 then constructs a 3D model of the passenger compartment 54 (including the location of the vehicle users 11) and spatially maps the interior of the passenger compartment 54 as well as the vehicle users' body position and hand location. The controller 34 then determines the 3D position of the users' hand and understands users' intent and manipulates the hologram 50 accordingly. For instance, the system 98 may determine whether the hand 15 of the vehicle user 11 virtually intersects a known location of the hologram 50 and, based on the hand gesture, the hologram 50 may move, change in size, rotate, or activate. Thus, the vehicle user 11 can interact with the hologram 50 through predetermined set of learned hand poses and articulations. The system 98 may alternatively (or additionally) use speech recognition to manipulate the hologram 50. For example, the vehicle user 11 may look at the hologram 50 and say "rotate" or "enlarge" or another voice command to manipulate the hologram 50. Also, the vehicle user 11 may manipulate the hologram 50 with a combination of natural methods. For example, while looking at the hologram 50, the vehicle user 11 may say "rotate this way" while simultaneously pointing to the left in order to rotate the hologram 50 to the left. As the hologram 50 is being manipulated from a single vehicle user's perspective, all other perspectives (i.e., viewpoints) of the other vehicle users 11 are change accordingly. Thus, the system 98 generates and continually updates the hologram 50 as required by each vehicle user's perspective around 360 degrees. Further, haptic feedback is provided to the vehicle user 11 that manipulated the hologram 50 to indicate to that vehicle user 11 that the hologram 50 is being manipulated based on his or her commands.

FIG. 9 is a flowchart for a method 100 for user interaction with a hologram. The method 100 may be executed by the controller 34 and begins at block 102, in which the controller 34 determines that the vehicle 10 is being driven using, for example, signals generated by the sensors 40. For example, the controller 34 may receive data from one of the sensors 40, such as a speed sensor, to determine that the vehicle 10 is moving. Then, the method 100 proceeds to block 104.

At block 104, one of the vehicle users 11 inside the passenger cabin 54 activates the 3D holographic display 29. As discussed above, the 3D holographic display may be a shared 360-degree 3D holographic display 29 configured to present the hologram 50 that can be shared by some or all the vehicle users 11 inside the passenger compartment 54. Then, the method 100 continues to block 106.

At block 106, the controller 34 uses sensor data from the sensors 40, such as the 3D depth sensors 45, to spatially map the location of the vehicle users 11 relative to the location of the hologram 50 (i.e., the virtual object image). Next, the method 100 continues to block 108.

At block 108, the controller 34 uses the sensor data from one or more sensors 40, such as cameras 4, the user tracker 43, and/or the microphones 31, to monitor the posture, hand pose, hand gestures, head movement, eye gaze, and voice of one or more of the vehicle users 11. The posture, hand pose, hand gestures, head movement, eye gaze, and voice of the vehicle users 11 are considered user inputs, which may be user commands. Each user command corresponds to a specific manipulation of the hologram 50. The method 100 then continues to block 110.

At block 110, the controller 34 determines, using the sensor data from the sensors 40, whether one or more vehicle users 11 made virtual contact with the hologram 50.

To do so, the controller 34 determines whether the hand 15 and/or another part of the body of the vehicle user 11 intersects the location of the hologram 50. If the vehicle user 11 has not made virtual contact with the hologram 50, then the method 100 proceeds to block 112.

At block 112, the controller 34 uses sensor data from the sensors 40, such as the microphones 31, to determine whether the vehicle user 11 utter a voice command with the eye gaze toward the hologram 50. At this point, the vehicle user 11 may have uttered the voice command with or without a hand gesture directed at the hologram 50. If no voice command has been uttered by the vehicle user 11, then the method 100 proceeds to block 114. At block 114, the controller 34 does not execute an action. Then, the method 100 returns to block 106.

Returning to block 110, if the vehicle user 11 made virtual contact with the hologram 50, then the method 100 proceeds to block 116. At block 116, the controller 34 determines the location, trajectory vector, speed, and/or orientation of the hand 15 of the vehicle user 11 that made virtual contact with the hologram 50. Then, the method 100 proceeds to block 118.

At block 118, the controller 34 determines the proper movement, rotation, sizing, and/or actuation of the hologram 50 based on the location, trajectory vector, speed, and/or orientation of the hand 15 of the vehicle user 11 that made virtual contact with the hologram 50. The controller 34 may determine the proper manipulation of the hologram 50 based on the predetermined set of learned hand poses and articulations. Also, returning to block 112, if the controller 34 detects that a voice command has been uttered by the vehicle user 11, then the method 100 proceeds to block 118. After block 118, the method 100 proceeds to block 120.

At block 120, the controller 34 commands the haptic actuator 47 to provide the appropriate haptic feedback to the vehicle user 11 that manipulated the hologram 50. As discussed above, the haptic feedback may be in the form of vibration or air pulses to the vehicle user 11 that manipulated the hologram 50. Then, the method 100 proceeds to block 122.

At block 122, the controller 34 commands the 3D holographic display 29 to update all user viewpoint perspective in accordance with the manipulation of the hologram 50. Then, the method 100 returns to block 108.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for user interaction with a hologram in a vehicle, comprising:

displaying the hologram inside a passenger compartment of the vehicle;

constructing a three-dimensional model of the passenger compartment to spatially map a location of a vehicle user relative to a location of the hologram, wherein the vehicle user is inside the passenger compartment, and the three-dimensional model of the passenger compartment includes a location of a hand of the vehicle user;

after displaying the hologram inside the passenger compartment of the vehicle, monitoring the vehicle user inside the passenger compartment of the vehicle to determine whether the vehicle user provided a user command;

determining that the vehicle user provided the user command, wherein determining that the vehicle user provided the user command includes determining that the vehicle user made virtual contact with the hologram, the vehicle user makes virtual contact with the hologram when the hand of the vehicle user is at a location that intersects the hologram; and in response to determining that the vehicle user provided the user command, manipulating the hologram in accordance with the user command.

2. The method of claim 1, wherein determining that the vehicle user provided the user command includes receiving a voice command from the vehicle user and determining that an eye gaze of the vehicle user is directed at the hologram.

3. The method of claim 1, wherein monitoring the vehicle user inside the passenger compartment of the vehicle to determine whether the vehicle user provided the user command includes capturing an image of a hand of the vehicle user, and determining that the vehicle user provided the user command includes detecting a hand gesture by the vehicle user inside the passenger compartment of the vehicle.

4. The method of claim 3, further comprising determining a trajectory vector, a speed, and an orientation of the hand gesture by the vehicle user inside the passenger compartment of the vehicle.

5. The method of claim 4, further comprising determining a movement of the hologram based on the user command by the vehicle user inside the passenger compartment.

6. The method of claim 5, wherein manipulating the hologram includes moving the hologram in accordance with the user command.

7. The method of claim 6, further comprising providing haptic feedback to the vehicle user inside the passenger compartment in response to manipulating the hologram in accordance with the user command.

8. The method of claim 1, wherein manipulating the hologram in accordance with the user command includes changing a size of the hologram.

9. The method of claim 1, wherein the vehicle user inside the passenger compartment of the vehicle is a first vehicle user of a plurality of vehicle users inside the passenger compartment of the vehicle, and the method further comprises updating the hologram from all viewpoints of the plurality of vehicle users.

10. A vehicle, comprising:
a body defining a passenger compartment;
a plurality of sensors disposed inside the passenger compartment;
a holographic display configured to generate a hologram inside the passenger compartment;
a controller in communication with the plurality of sensors and the holographic display, wherein the controller is programmed to:

command the holographic display to display the hologram inside the passenger compartment;

after displaying the hologram inside the passenger compartment, command the plurality of sensors to monitor a vehicle user inside the passenger compartment to determine whether the vehicle user provided a user command;

determine that the vehicle user provided the user command using sensor data received from at least one of the plurality of sensors; and in response to determining that the vehicle user provided the user command, command the holographic display to manipulate the hologram in accordance with the user command.

11. The vehicle of claim 10, wherein the controller is programmed to determine that the vehicle user made virtual contact with the hologram to determine that the vehicle user provided the user command, wherein the vehicle user makes virtual contact with the hologram when a hand of the vehicle user is at a location that intersects the hologram.

12. The vehicle of claim 10, wherein, to determine that the vehicle user provided the user command, the controller is programmed to:
receive a voice command from the vehicle user; and
determine that an eye gaze of the vehicle user is directed at the hologram.

13. The vehicle of claim 10, wherein the controller is programmed to command at least one of the plurality of sensors to capture an image of a hand of the vehicle user and detect a hand gesture by the vehicle user inside the passenger compartment to determine that the vehicle user provided the user command.

14. The vehicle of claim 13, wherein the controller is programmed to determine a trajectory vector, a speed, and an orientation of the hand gesture by the vehicle user inside the passenger compartment of the vehicle.

15. The vehicle of claim 14, wherein the controller is programmed to determine a movement of the hologram based on the user command by the vehicle user inside the passenger compartment.

16. The vehicle of claim 15, wherein the controller is programmed to command the holographic display to move the hologram in accordance with the user command.

17. The vehicle of claim 16, further comprising a haptic actuator in communication with the controller, and the controller is programmed to command the haptic actuator to provide haptic feedback to the vehicle user inside the passenger compartment in response to manipulating the hologram in accordance with the user command.

18. The vehicle of claim 10, wherein the controller is programmed to command the holographic display to change a size of the hologram.

19. The vehicle of claim 10, wherein the vehicle user inside the passenger compartment of the vehicle is a first vehicle user of a plurality of vehicle users inside the passenger compartment, and the controller is programmed to command the holographic display to update updating the hologram from all viewpoints of the plurality of vehicle users, the vehicle is an autonomous vehicle, the vehicle includes a plurality of seats arranged in a camp-fire seating configuration such that at least one of the plurality of seats is facing at least another one of the plurality of seats, the body includes a headliner and a vehicle floor, the passenger compartment is delimited by the vehicle floor and the headliner, the vehicle further includes a plurality of haptic actuators in communication with the controller, and the controller is programmed to command the plurality of haptic actuators to provide haptic feedback to the plurality of vehicle users inside the passenger compartment in response to manipulating the hologram in accordance with the user command, each of the plurality of haptic actuators is directly coupled to a corresponding one of the plurality of seats to provide the haptic feedback through the plurality of seats, the plurality of sensors includes a plurality of microphones, the plurality of microphones are directly coupled to the headliner to capture voice commands from the plurality of vehicle users in the passenger compartment, the plurality of sensors include a plurality of cameras, the plurality of cameras are directly coupled to the headliner to facilitate capturing images of the plurality of vehicle users in the passenger compartment, the plurality of sensors includes a plurality of 3D depth sensors, the plurality of 3D depth sensors are directly coupled to the headliner to facilitate sensing a three-dimensional location of each of the plurality of vehicle users in the passenger compartment, the holographic display is directly coupled to the headliner to present the hologram inside the passenger compartment, the hologram is a three-dimensional hologram that spans three hundred sixty around the holographic display, the controller is programmed to construct a three-dimensional model of the passenger compartment, the three-dimensional model of the passenger compartment includes of the plurality of vehicle users, the three-dimensional model of the passenger compartment maps a body position of the plurality of vehicle users in the passenger compartment, the three-dimensional model of the passenger compartment maps a location of the hand of each of the plurality of vehicle users in the passenger compartment, the plurality of 3D depth sensors includes a plurality of Time-of-Flight sensors, the controller is programmed to determine a specific manipulation of the hologram based on a plurality of predetermined set of learned hand poses, the plurality of 3D depth sensors includes a plurality of stereo depth cameras, and the controller is programmed to detect simultaneous virtual contact with the hologram by the plurality of vehicle users, and the controller is programmed to command the holographic display to manipulate the hologram in response to simultaneous virtual contact with the hologram by the plurality of vehicle users.

\* \* \* \* \*